Oct. 11, 1960 R. EBENBACH 2,955,547
LIGHT WEIGHT MOTOR DRIVEN RAILWAY CAR TRUCK
Filed Feb. 7, 1958 2 Sheets-Sheet 1

INVENTOR
Robert Ebenbach

BY
Wm. R. Glisson
ATTORNEY

Oct. 11, 1960    R. EBENBACH    2,955,547
LIGHT WEIGHT MOTOR DRIVEN RAILWAY CAR TRUCK
Filed Feb. 7, 1958    2 Sheets-Sheet 2
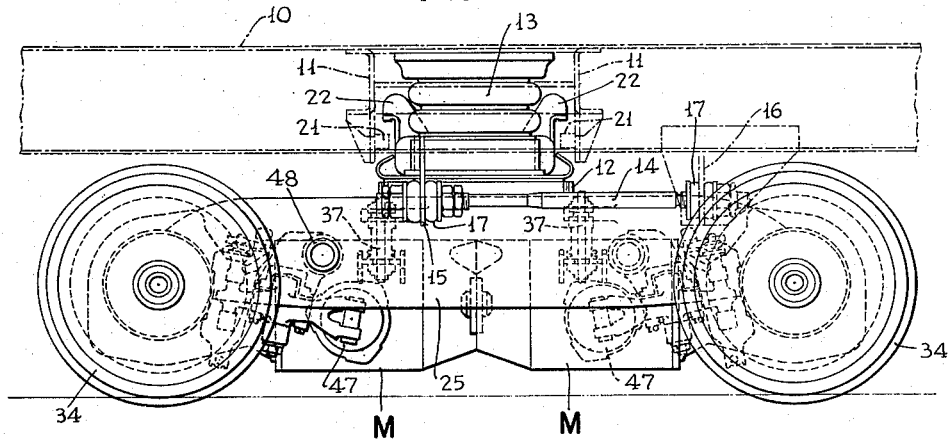
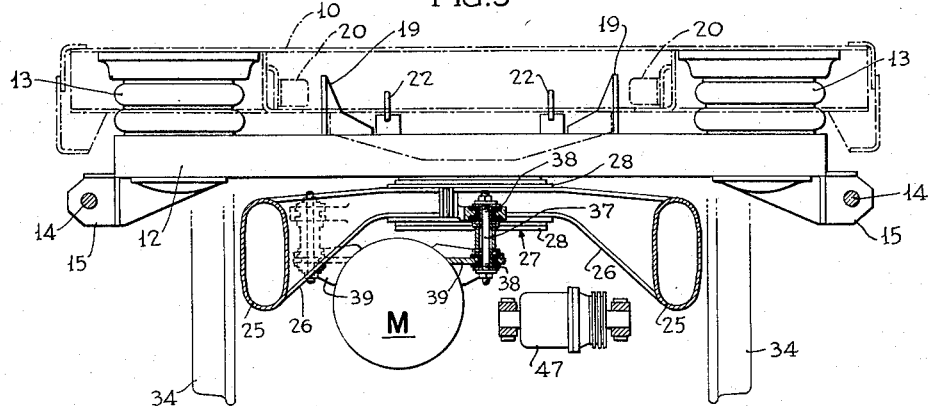
INVENTOR
Robert Ebenbach
BY
ATTORNEY

2,955,547

LIGHT WEIGHT MOTOR DRIVEN RAILWAY CAR TRUCK

Robert Ebenbach, Glenside, Pa., assignor to The Budd Company, Philadelphia, Pa., a corporation of Pennsylvania Filed Feb. 7, 1958, Ser. No. 713,915

2 Claims. (Cl. 105—139)

This invention relates to a light weight motor-driven railway car truck and has for an object the provision of improvements in this art.

The particular light weight truck with which the present invention is associated is known as the "Pioneer" truck. It is described in the copending application of Walter B. Dean, Serial No. 562,180, filed January 30, 1956 now Patent No. 2,908,230, dated Oct. 13, 1959. As illustrated in the copending application referred to, the truck comprises rigid side frames mounted on spaced axles and having inward V-shaped projections associated with a center joint depending from a bolster which carries a car body on air springs and is yoked to the body by swinging stay bars and other connections. The wheel-axle units outside the wheels are provided with outboard brake disk units.

The present truck is intended for use in subways and elsewhere where it is impractical, because of side-track equipment, to use outboard disk brake equipment so inboard brake equipment is employed. By using large size brake units instead of the prior small size outboard brake units, by using dynamic braking with genemotors and by a judicious arrangement of the brake units and motor drive units it has been found possible to secure ample braking with only one brake unit instead of the two units per axle previously used. The inboard position allows brake disks of larger diameter, greater length and of greater cooling capacity to be used than was possible when the disks were disposed outboard of the wheels and this is especially true when there is only one brake disk per axle.

The objects and novel features of the invention will be apparent from the following description of an exemplary embodiment thereof, reference being made to the accompanying drawings wherein:

Fig. 2 is a side elevation; and

Fig. 3 is a vertical transverse section taken on the line 3—3 of Fig. 1.

Figure 1:
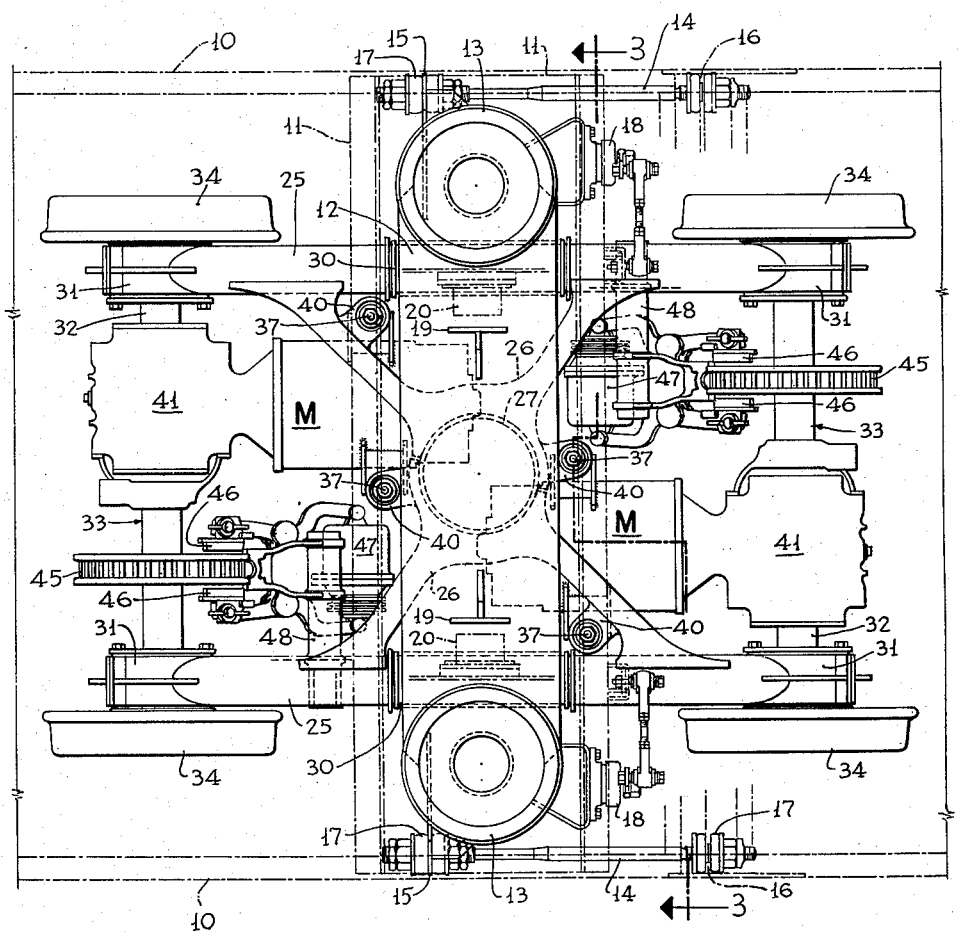
Fig. 1 is a top plan view of a truck embodying the invention.

In order to show the general environment of the truck, part of one end of a railway car 10 is shown in broken lines. The car body is provided with longitudinally spaced transverse body bolsters 11 between which a truck bolster 12 is disposed. Near its ends the truck bolster 12 supports air springs 13 and these air springs directly support the car body near its outer edges.

The truck bolster is effectively a part of the car body assembly in that it does not have any major turning movement relative thereto but it does have limited relative vertical movement through the air springs and has some limited transverse movement. Stay bars 14 connected between bolster brackets 15 and car body brackets 16 and having resilient joints 17 at their ends provide for this relative vertical and transverse movement of the bolster while restricting relative longitudinal movement. The rubber elements of the resilient joints provide a small amount of resisted longitudinal movement. Buffers or motion shock absobing dampers generally denoted by the numeral 18 damp the transverse movements of the bolster 12. Transverse movement is limited by brackets 19 carried by the bolster 12 for engaging resilient stops 20 on the car body. The vertical movements of the bolster are damped and the pressure of air in the springs is controlled in accordance with car loading by means disclosed in the copending application but not requiring description herein. Separation between the car body and truck bolster is prevented except when desired by abutments 21 carried by the body bolsters and overhanging lugs 22 carried by the truck bolster.

The drive motors M (or genemotors, since they act as generators for braking action) are mounted at diagonally opposed locations on the truck frame which comprises two rigid but relatively movable side frame members 25 each having an integral V-shaped inboard extension 26 with a concave portion at its inner end which has generally universal movement about a large center joint journal 27 depending from the center of the bolster 12. The journal has large collar flanges 28 to retain the concave inner ends of the V-shaped projections in position. The bolster 12 rests on slide joints 30 on the tops of the side frame members 25 and these slide joints for relative horizontal turning movements also provide the necessary turning movement of the side frames about horizontal transverse axes as required by trauck irregularities.

At their ends the side frame members 25 are connected by universal resilient joints 31 to the axles 32 of rigid wheel-axle units 33 having wheels 34.

The motors M are supported from the inboard V-shaped extensions 26 by swing rods 37 having resilient joints 38 at their ends secured in brackets 39 on the motor casing and brackets 40 on the frame extensions 26. For each motor there is a swing hanger support from each of the inboard extensions of the two side frame members.

The motor casing is continued to form the casing of a drive mechanism 41 for an axle 32 driven by the motor shaft. It is to be noted that the truck frame is of such a nature as to take the drive motor therebeneath even though mounted to one side of the longitudinal center line. The inboard extensions 26 are tapered rapidly upward from the side frame members to clear the motors therebelow. Heretofore it has not been possible to mount motors beneath the truck frame when arranged at the sides of the center line, there being space for only the drive shaft which required the motor to be placed near one axle to drive the other. This is wasteful of space and does not allow an integral rigid motor and drive gear (usually a "Spicer" drive) casing to be used. Obviously such a common casing, besides being rigid to transmit torque directly, does not require multiple packed shaft joints and avoids dirt and injury to operating parts.

On the side opposite the axle drive gear unit 41 each axle is provided with a large wide ventilated brake disk 45 associated with brake shoes 46 of brake operating mechanism, generally denoted by the numeral 47, which is mounted on stub shaft supports 48 rigidly secured to the side frame members, as by welding or otherwise.

As shown in Fig. 1, the opposed diagonal arrangement of motors and brake units causes one leg of each V-shaped inboard side frame projection to be longer than the other but this does not detract from the general strength or operation of the truck.

It is thus seen that the invention provides a simple, inexpensive and effective truck with motor-brake units and disk brake units which are entirely adequate for the needs of the truck and car which they serve. This is done without crowding the space on the frame and without restricting the action of the frame.

While one embodiment of the invention has been described for purposes of illustration it will be understood that there may be various embodiments and modifications within the general scope of the invention.

What is claimed is:

1. A rail car truck comprising in combination, a frame including side frame members each having an integral V-shaped inboard extension intermediate its length, the inboard extensions being inclined upwardly underneath from the side frames toward the center and terminating at the joint of the V at the inner end in a central vertical-axis joint with the other extension, wheel-axle units carried in bearings at the ends of said side frame members and holding the side frame members together for vertical turning movements, a motor and longitudinal driving connections therefor to each axle, the motors being mounted beneath the inclined portions of said V-shaped extensions and having their axes arranged longitudinally of the truck, a rigid unitary casing for each motor and its driving connection, the motors and their driving connections being located on opposite sides of a central vertical longitudinal plane and on opposite sides of a central vertical transverse plane so as to be disposed diagonally opposite each other, leaving the other diagonally opposite spaces clear of the motors and their drives, and resilient suspension means supporting each motor at transversely spaced points from said inboard frame extensions, one point of support being on one frame extension near its side frame and the other point of support being on the other inboard frame extension near said vertical-axis joint.

2. A rail car truck comprising in combination, a frame including side frame members each having an integral V-shaped inboard extension intermediate its length, the inboard extensions being inclined upwardly underneath from the side frames toward the center and terminating at the joint of the V at the inner end in a central vertical-axis joint with the other extension, wheel-axle units carried in bearings at the ends of said side frame members and holding the side frame members together for vertical turning movements, brake mechanism for the wheel-axle units mounted inboard on said frame between the axles at diagonally opposite corners, a motor and longitudinal driving connections therefor to each axle, the motors being mounted beneath the inclined portions of said V-shaped extensions and having their axes arranged longitudinally of the truck, a rigid unitary casing for each motor and its driving connection, the motors and their driving connections being located on opposite sides of a central vertical transverse plane so as to be disposed diagonally opposite each other, leaving the other diagonally opposite spaces with the brake mechanism clear of the motors and their drives, and resilient suspension means supporting each motor at transversely spaced points from said inboard frame extensions, one point of support being on one frame extension near its side frame and the other point of support being on the other inboard frame extension near said vertical-axis joint.

References Cited in the file of this patent
UNITED STATES PATENTS

| | | |
|---|---|---|
| 1,813,141 | Bethel | July 7, 1931 |
| 2,023,756 | Brownyer | Dec. 10, 1935 |
| 2,251,950 | Piron | Aug. 12, 1941 |
| 2,336,661 | Williams | Dec. 14, 1943 |
| 2,425,282 | Ledwinka | Aug. 5, 1947 |
| 2,562,573 | Piron | July 31, 1951 |
| 2,594,734 | Cripe | Apr. 29, 1952 |